US012664197B2

(12) United States Patent
Wei et al.

(10) Patent No.: US 12,664,197 B2
(45) Date of Patent: Jun. 23, 2026

(54) EVOLUTION OF TOPICS IN A MESSAGING SYSTEM

(71) Applicants: Yanran Wei, Blacksburg, VA (US); Vítor Silva Sousa, Los Angeles, CA (US); Leonardo Ribas Machado Das Neves, Marina del Rey, CA (US)

(72) Inventors: Yanran Wei, Blacksburg, VA (US); Vítor Silva Sousa, Los Angeles, CA (US); Leonardo Ribas Machado Das Neves, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 1212 days.

(21) Appl. No.: 17/399,584

(22) Filed: Aug. 11, 2021

(65) Prior Publication Data

US 2023/0050622 A1     Feb. 16, 2023

(51) Int. Cl.
| | |
|---|---|
| *G06F 40/289* | (2020.01) |
| *G06N 20/00* | (2019.01) |
| *H04L 51/216* | (2022.01) |

(52) U.S. Cl.
CPC ............ *G06N 20/00* (2019.01); *H04L 51/216* (2022.05)

(58) Field of Classification Search
CPC .. G06N 20/00; H04L 51/216; G06Q 30/0201; G06Q 30/0251; G06Q 50/01; G06F 16/345; G06F 16/2462; G06F 16/2474
See application file for complete search history.

(56) References Cited

U.S. PATENT DOCUMENTS

| | | | |
|---|---|---|---|
| 9,760,838 B1* | 9/2017 | Danson | G06F 40/279 |
| 2017/0206258 A1* | 7/2017 | Awasthi | G06F 16/34 |
(Continued)

FOREIGN PATENT DOCUMENTS

| | | | | |
|---|---|---|---|---|
| CN | 104077347 A | * | 10/2014 | H04L 43/08 |
| CN | 104408108 A | * | 3/2015 | G06F 17/30864 |
(Continued)

OTHER PUBLICATIONS

Suhyeon Kim b , Haecheong Park a , Junghye Lee, Word2vec-based latent semantic analysis (W2V-LSA) for topic modeling: A study on blockchain technology trend analysis (Year: 2020).*
(Continued)

*Primary Examiner* — Hassan Mrabi
(74) *Attorney, Agent, or Firm* — CM Law PLLC; Stephen J. Weed

(57) ABSTRACT

Systems and methods for determining how topics evolve in a messaging system extract at least one N-gram from data content (e.g., caption of messages) in the messaging system and detect anomalous behavior in N-gram frequencies over time. The anomalous behavior is used to select candidate N-grams for a determination of whether a topic of a candidate N-gram is evolving or fading. The candidate N-grams are clustered into cluster groups that are used to train at least one time series forecasting model to predict N-gram frequencies in a future time window. A time series of the N-gram frequency is divided into old and recent partitions and pattern recognition is applied to the predicted N-gram frequencies to identify an evolving or fading topic when the difference between a frequency of each anomaly and an average rolling median for each partition is greater for the most recent partition.

19 Claims, 15 Drawing Sheets

900

910 Big query: extract n-gram from data

920 Data cleaning: clean data and preserve data privacy

930 Candidate identification anomaly detection

940 Cluster candidates: merge groups of candidates into a single topic

950 Predict interests : time series forecasting

960 Identify evolving topics by pattern recognition

(56)                References Cited

U.S. PATENT DOCUMENTS

| | | | |
|---|---|---|---|
| 2017/0243382 A1* | 8/2017 | Banerjee | G06Q 10/107 |
| 2017/0270006 A1* | 9/2017 | Kandylas | G06Q 50/01 |
| 2018/0067910 A1* | 3/2018 | Alonso | G06F 16/36 |
| 2019/0102374 A1 | 4/2019 | Tiwari | |
| 2019/0362021 A1* | 11/2019 | Balduino | G06Q 30/01 |
| 2020/0117709 A1* | 4/2020 | Galitsky | G06N 20/00 |
| 2020/0394649 A1* | 12/2020 | Daly | G06Q 10/063 |
| 2021/0042830 A1* | 2/2021 | Burke | G06Q 20/341 |
| 2021/0103608 A1* | 4/2021 | Ganti | G06N 20/00 |
| 2024/0152541 A1* | 5/2024 | Zhu | G06F 16/358 |

FOREIGN PATENT DOCUMENTS

| | | | | | |
|---|---|---|---|---|---|
| CN | 105468669 A | * | 4/2016 | | G06F 16/951 |
| CN | 106682991 A | * | 5/2017 | | G06Q 50/01 |
| CN | 107808067 A | * | 3/2018 | | G06Q 50/01 |
| CN | 107918611 A | * | 4/2018 | | G06F 16/951 |
| CN | 108509517 A | * | 9/2018 | | G06F 40/295 |
| CN | 109242534 A | * | 1/2019 | | G06Q 10/04 |
| CN | 111201567 A | * | 5/2020 | | G06F 40/216 |
| CN | 111324795 A | * | 6/2020 | | |
| CN | 111427999 A | * | 7/2020 | | G06F 16/3344 |
| CN | 112395539 A | * | 2/2021 | | G06F 16/355 |
| CN | 112597269 A | * | 4/2021 | | |
| CN | 112711705 A | * | 4/2021 | | G06F 16/9535 |
| CN | 112818125 A | * | 5/2021 | | G06F 16/353 |
| CN | 113065975 A | * | 7/2021 | | G06F 16/35 |
| CN | 108230169 B | * | 12/2021 | | G06Q 50/01 |
| WO | WO-2012088720 A1 | * | 7/2012 | | G06F 17/3053 |
| WO | WO-2015065290 A1 | * | 5/2015 | | G06Q 10/10 |

OTHER PUBLICATIONS

Adhikari et al. "An Introductory Study on Time Series Modeling and Forecasting" arXiv:1302.6613 [cs.LG] (2013).

Liu et al. "Isolation Forest," 2008 Eighth IEEE International Conference on Data Mining, Pisa, Italy, 2008, pp. 413-422, doi: 10.1109/ICDM.2008.17.

Oreshkin et al. "N-BEATS: neural basis expansion analysis for interpretable time series forecasting" (arXiv: 1905.10437 [cs.LG], Cornell University, May 24, 2019.

Salinas et al. "DeepAR: Probabilistic forecasting with autoregressive recurrent networks," International Journal of Forecasting, vol. 36, Issue 3, Jul.-Sep. 2020, pp. 1181-1191.

Taylor SJ, Letham B. 2017. Forecasting at scale. PeerJ Preprints 5:e3190v2 https://doi.org/10.7287/peerj.preprints.3190v2.

International Search Report and Written Opinion for International Application No. PCT/US2022/038830, dated Nov. 7, 2022 (Nov. 7, 2022)—10 pages.

1st Chinese Office Action for CN 202280055854.2 dated Apr. 29, 2026, 16 pages (English machine translation—16 pages).

Aiello, et al.: "Sensing Trending Topics in Twitter," IEEE Transaction on Multimedia, No. 6, 2013, pp. 1268-1282.

* cited by examiner

100

Database

400

| | |
|---|---|
| 402 | Msg_Id |
| 404 | Msg_Text |
| 406 | Msg_Image |
| 408 | Msg_Vid |
| 410 | Msg_Aud |
| 412 | Msg_Aug |
| 414 | Msg_Dur |
| 416 | Msg_Location |
| 418 | Msg_Stry_Id |
| 420 | Msg_Tag |
| 422 | Msg_Sender_Id |
| 424 | Msg_Receiver_Id |

316 Image Table

314 Video Table

310 Augmentation Table

312 Story Table

304 Entity Table

900

910 — Big query: extract n-gram from data

920 — Data cleaning: clean data and preserve data privacy

930 — Candidate identification anomaly detection

940 — Cluster candidates: merge groups of candidates into a single topic

950 — Predict interests : time series forecasting

960 — Identify evolving topics by pattern recognition

EVOLUTION OF TOPICS IN A MESSAGING SYSTEM

TECHNICAL FIELD

Examples set forth in the present disclosure relate to a social media messaging system. More particularly, but not by way of limitation, the present disclosure describes techniques for analyzing content generated in the messaging system to predict what messaging topics will gain in popularity and what messaging topics will fall in popularity in the future.

BACKGROUND

Current messaging systems provide the opportunity for users to produce and post content such as images and video. The content is made available in the messaging systems for other users to consume. The users may produce a very large amount of content. For example, there may be millions of images and videos available for users to consume.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

Figure 1:
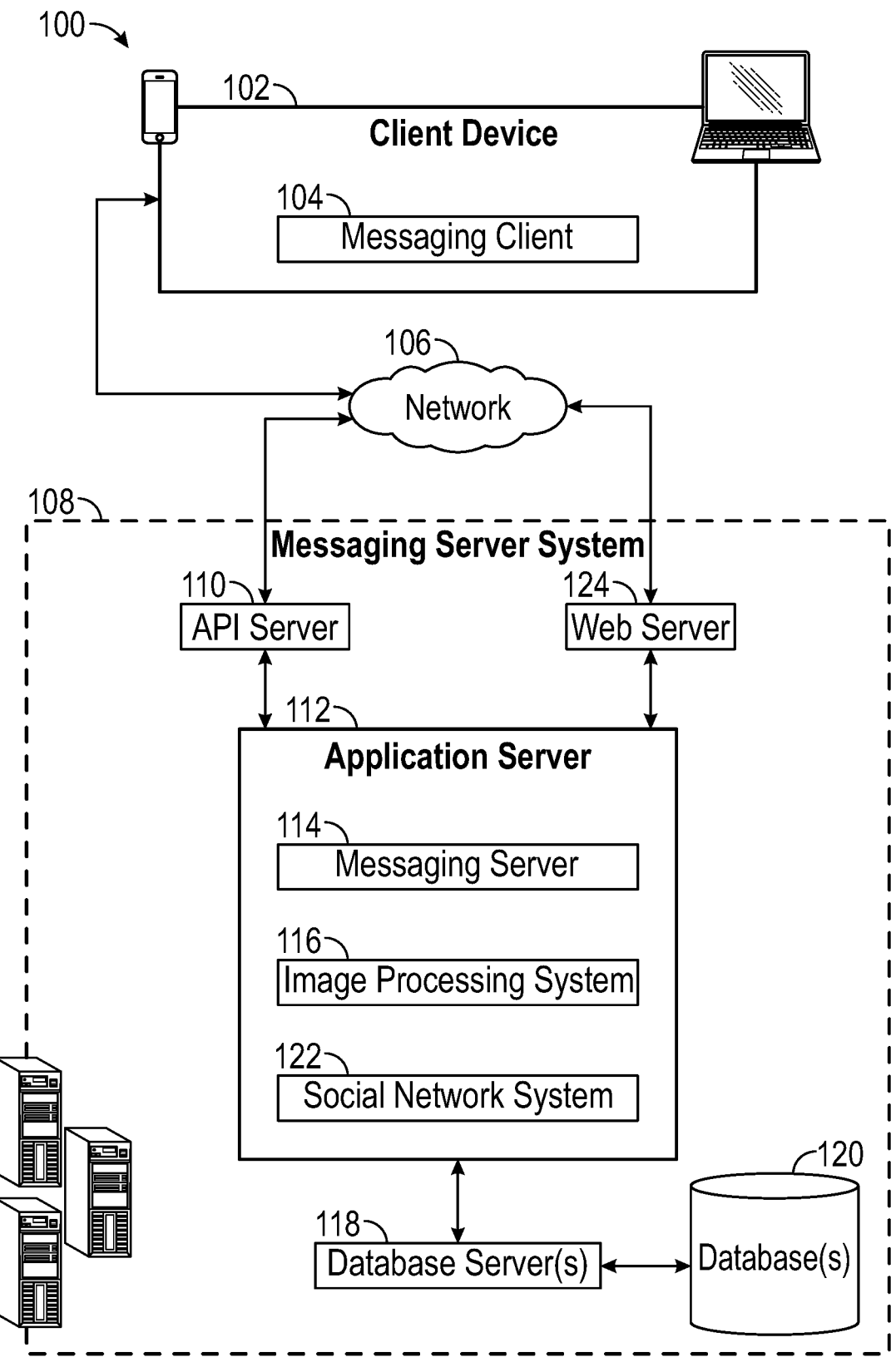
FIG. 1 is a diagrammatic representation of a networked environment in which the present disclosure may be deployed, in accordance with some examples.

In social media platforms, users' interactions are often based on sharing textual contents (e.g., captions) with other users. This content may correlate to a wide variety of topics and users' interests that evolve over time given external factors such as holidays or different moments in the users' lives. Understanding how the interests of users evolve over time and providing some insights about future behaviors in the social media platform enables targeting of a specific audience or sustaining daily active users. In the following description, a methodology is provided to (i) extract and clean N-grams from captions (i.e., to preserve user privacy), (ii) detect anomalous behaviors in N-grams frequencies over time, (iii) cluster n-grams with similar time series using Pointwise Mutual Information (PMI), (iv) train a time series forecasting model to predict n-gram frequencies in the next days/weeks/months, and (v) characterize evolving/fading topics. With these insights about evolving/fading topics, interests that users should keep promoting in the future or that are worthy of gaining more traction are better understood.

The systems and methods described herein thus determine trends from textual content that is produced and consumed by users of the messaging system. The messaging system analyzes the content data to determine N-grams that characterize the content produced in the messaging system and implements the techniques described herein to identify evolving and fading topics.

As used herein, an N-gram is N words that are determined from the content. N-grams may be a contiguous sequence of N items (e.g., words) from a given sample of text or speech. For example, the items can be phonemes, syllables, letters, words, or base pairs. Example N-grams include "Tokyo Olympics," "Delta variant," etc. In accordance with some examples, the N-grams are determined from message captions. In such examples, the messaging system may determine which N-grams are trending based on a normalized frequency of use.

In a sample configuration, the systems and methods described herein may provide automatic and preemptive identification of evolving and fading topics in the form of a word or sentence in captions. The systems and methods may also suggest topics that need some boost so that they do not disappear in a social media platform, i.e., it is useful for advertising and marketing initiatives. For example, in such a case, advertising would target the topics that are predicted to decline. The systems and methods described herein also may be used to retain users on a social media platform by providing content that addresses their interests. For example, content could be provided relating to topics that are pre-dicted to increase.

Examples in this disclosure are directed to a system, a method, and computer-readable medium including instruc-tions for determining how topics evolve in a messaging system. The systems and methods extract at least one N-gram from data content (e.g., caption of messages) in the messaging system and detect anomalous behavior in N-gram frequencies over time. The anomalous behavior is used to select candidate N-grams for a determination of whether a topic of a candidate N-gram is evolving or fading. A time series of the N-gram frequency is divided into old and recent partitions and pattern recognition is applied to the predicted N-gram frequencies to identify an evolving or fading topic when the difference between a frequency of each anomaly and an average rolling median for each partition is greater for the most recent partition. Then, the candidate N-grams segmented by their behavior, i.e., evolving or fading topic candidates, are clustered into cluster groups that are used to train at least one time series forecasting model to predict N-gram frequencies in a future time window.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the rel-evant teachings can be applied or practiced in a variety of ways. The terminology and nomenclature used herein is for the purpose of describing particular aspects only and is not intended to be limiting. In general, well-known instruction instances, protocols, structures, and techniques are not nec-essarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or com-munication media, one or more of which may modify, manipulate, or carry the electrical signals. The term "on" means directly supported by an element or indirectly sup-ported by the element through another element integrated into or supported by the element.

Additional objects, advantages and novel features of the examples will be set forth in part in the following descrip-tion, and in part will become apparent to those skilled in the art upon examination of the following and the accompany-ing drawings or may be learned by production or operation of the examples. The objects and advantages of the present subject matter may be realized and attained by means of the methodologies, instrumentalities and combinations particu-larly pointed out in the appended claims.

Reference now is made in detail to the examples illus-trated in the accompanying drawings and discussed below. Examples of the system and method will be described with respect to FIGS. 1-15. FIGS. 1-7 illustrate a messaging system of the type described in related U.S. patent applica-tion Ser. No. 16/948,582, filed on Sep. 24, 2020, the contents of which are hereby incorporated by reference, while FIGS. 8-15 describe techniques for determining the evolution of topics in such a messaging system.

Networked Computing Environment

FIG. 1 is a block diagram showing an example messaging system 100 for exchanging data (e.g., messages and asso-ciated content) over a network. As illustrated, the messaging system 100 includes multiple instances of a client device 102, each of which hosts a number of applications, including a messaging client 104. Each messaging client 104 is communicatively coupled to other instances of the messag-ing client 104 and a messaging server system 108 via a network 106 (e.g., the Internet). In the example messaging system 100, a messaging client 104 may communicate and exchange data with another messaging client 104 and with the messaging server system 108 via the network 106. The data exchanged between messaging client 104, and between a messaging client 104 and the messaging server system 108, includes functions (e.g., commands to invoke func-tions) as well as payload data (e.g., text, audio, video, or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the mes-saging client 104 or the messaging server system 108 may be a design choice. For example, it may be technically preferable to initially deploy certain technology and func-tionality within the messaging server system 108 but to later migrate this technology and functionality to the messaging client 104 where a client device 102 has sufficient processing capacity.

The messaging server system 108 supports various ser-vices and operations that are provided to the messaging client 104. Such operations include transmitting data to, receiving data from, and processing data generated by the messaging client 104. For example, this data may include message content, client device information, geolocation information, media augmentation and overlays, message content persistence conditions, social network information, and live event information. Data exchanges within the messaging system 100 are invoked and controlled through functions available via user interfaces (UIs) of the messag-ing clients 104.

An Application Program Interface (API) server 110 of the messaging server system 108 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The API server 110 receives and transmits message data (e.g., commands and message payloads) between the client device 102 and the application servers 112. Specifically, the API server 110 provides a set of interfaces (e.g., routines and protocols) that can be called or queried by the messaging client 104 in order to invoke functionality of the application servers 112. The API server 110 also may expose various functions supported by the application servers 112, including account registration, login functionality, the sending of messages via the application servers 112 from a particular messaging client 104 to another messaging client 104, the sending of media files (e.g., images or video) from a messaging client 104 to a messaging server 114, and for possible access by another messaging client 104 the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

Figure 2:
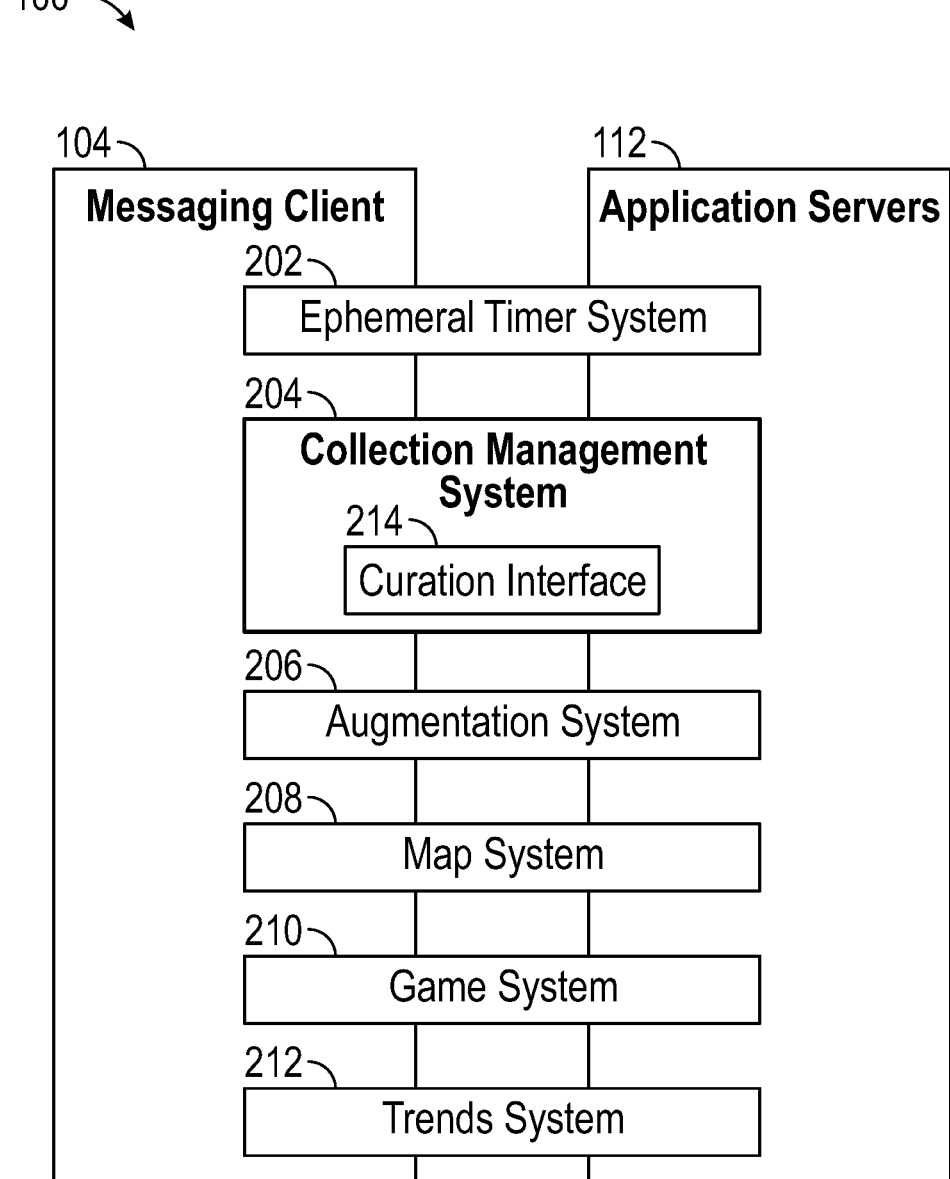
FIG. 2 is a diagrammatic representation of a messaging system, in accordance with some examples.
Figure 3:
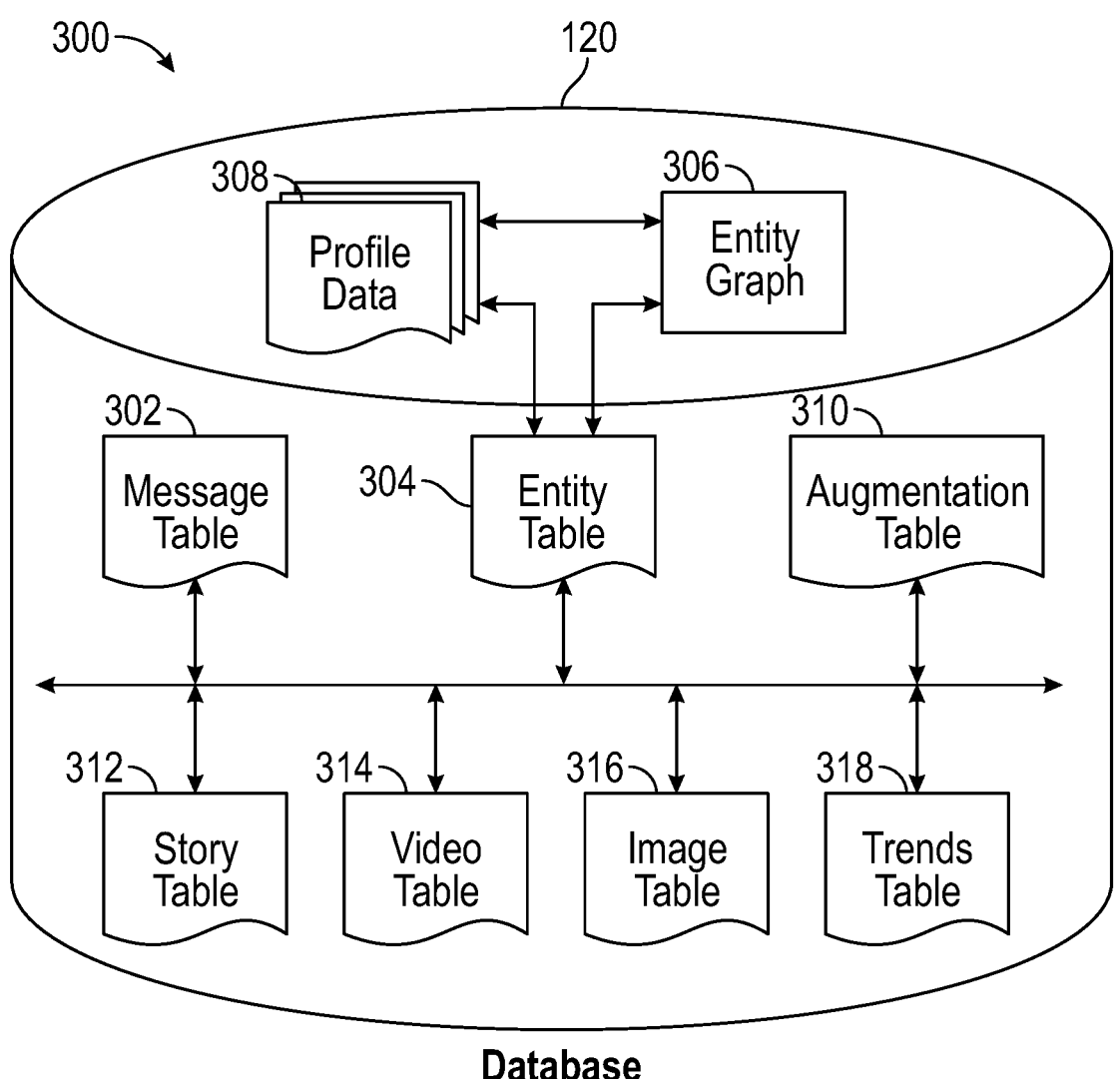
FIG. 3 is a diagrammatic representation of a data structure as maintained in a database, in accordance with some examples.

The application servers 112 host a number of server applications and subsystems including, for example, a messaging server 114, an image processing server 116, and a social network system 122. The messaging server 114 implements a number of message processing technologies and functions, particularly related to the aggregation and other processing of content (e.g., textual and multimedia content) included in messages received from multiple instances of the messaging client 104. The text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing. The application servers 112 also may include an image processing system 116 that is dedicated to performing various image processing operations, typically with respect to images or video within the payload of a message sent from or received at the messaging server 114. The social network system 122 supports various social networking functions and services and makes these functions and services available to the messaging server 114. To this end, the social network system 122 may maintain and access an entity graph 306 (as shown in FIG. 3) within the database 120. Examples of functions and services supported by the social network system 122 include the identification of other users of the messaging system 100 with which a particular user has relationships or is "following," and also the identification of other entities and interests of a particular user. SYSTEM ARCHITECTURE FIG. 2 is a block diagram illustrating further details of the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, a game system 210, and a trends system 212.

In sample configurations, the ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. As used herein, an "ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 may further include a curation interface 214 that allows a collection manager to manage and curate a particular collection of content. For example, the curation interface 214 may enable an event organizer to curate a collection of content relating to a specific event (e.g., delete inappropriate content or redundant messages). Additionally, the collection management system 204 may employ machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 may operatively supply a media overlay or augmentation (e.g., an image filter) to the messaging client 104 based on a geolocation of the client device 102. In another example, the augmentation system 206 may operatively supply a media overlay to the messaging client 104 based on other information, such as social network information of the user of the client device 102. A media overlay may include audio and visual content and visual effects. Examples of audio and visual content include pictures, texts, logos, animations, lenses, and sound effects. An example of a visual effect includes color overlaying. The audio and visual content or the visual effects may be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 may provide a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation. In other examples, the augmentation system 206 may provide a merchant-based publication platform that enables merchants to select a particular media overlay associated with a geolocation via a bidding process. For example, the augmentation system 206 may associate the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308 in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The trends system 212 provides various functions related to determining trends and supports providing recommendations based on trends to the messaging client 104. The trends system 212 provides a system to aid in the generation of additional modifications that the augmentation system 206 may provide to the messaging client 104. A modification may be termed an augmentation, in accordance with some embodiments. The trends system 212 may monitor and determine statistics related to content generated within the messaging system 100. The trends system 212 also may monitor the activity of the collection management system 204, augmentation system 206, map system 208, and game system 210 as well as other activities of the messaging client 104 and application servers 112 to determine content that is trending. The trends system 212 may generate recommendations to the messaging client 104 and/or application servers 112 such as which content to display or suggest to users. The trends system 212 may produce additional content or suggest which category of content should be produced. The trends system 212 also may produce reports that may be used for marketing and sales and that may determine which content includes advertisements and to help determine a value for an advertisement. The trends system 212 may analyze content and determine external events such as the pandemic from the coronavirus and generate new content to indicate the external events. As will be explained in more detail below, the evolution of topics in the messaging system also may be determined by the trends system 212 in sample configurations.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

As illustrated, the database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4. An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. On the other hand, the profile data 308 stores multiple types of profile data about a particular entity. The profile data 308 may be selectively used and presented to other users of the messaging system 100 based on privacy settings specified by a particular entity. Where the entity is an individual, the profile data 308 may include, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time. Where the entity is a group, the profile data 308 for the group may similarly include one or more avatar representations associated with the group, in addition to the group name, members, and various settings (e.g., notifications) for the relevant group.

The database 120 may also store augmentation data, such as overlays or filters, in an augmentation table 310. The augmentation data is associated with and applied to videos (for which data is stored in a video table 314) and images (for which data is stored in an image table 316). In one example, filters are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102. Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video. Augmentation data may include augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data may involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or nonliving things such as chairs, cars, or other objects. In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas, removing at least some part of areas from the frames of the video stream, including one or more new objects into areas which are based on a request for modification, and modifying or distorting the elements of an area or object. In various examples, any combination of such modifications or other similar modifications may be used.

For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points. In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

Referring back to FIG. 3, a story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. A collection may also constitute a "live story," which is a collection of content from multiple users that is created manually, automatically, or using a combination of manual and automatic techniques. For example, a "live story" may constitute a curated stream of user submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database 120 can also store processed content components, a metrics database, a user database, an aggregated database, and trends in a trends table 318 that may be maintained for use in the processes described below with respect to FIGS. 8-15.

Data Communications Architecture

Figure 4:
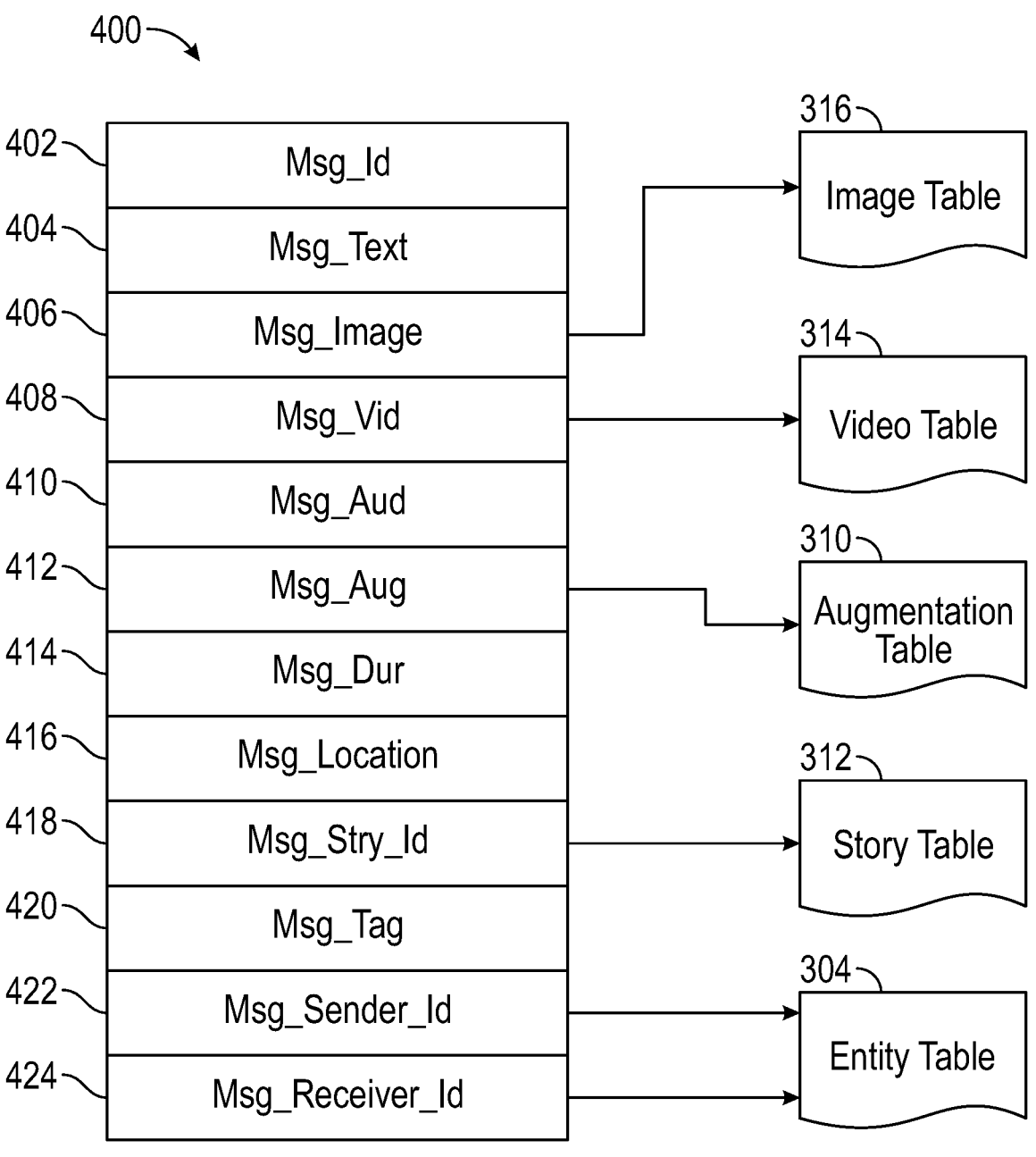
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "inflight" data of the client device 102 or the application servers 112. A message 400 is shown to include the following example components:

Message identifier 402: a unique identifier that identifies the message 400.

Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
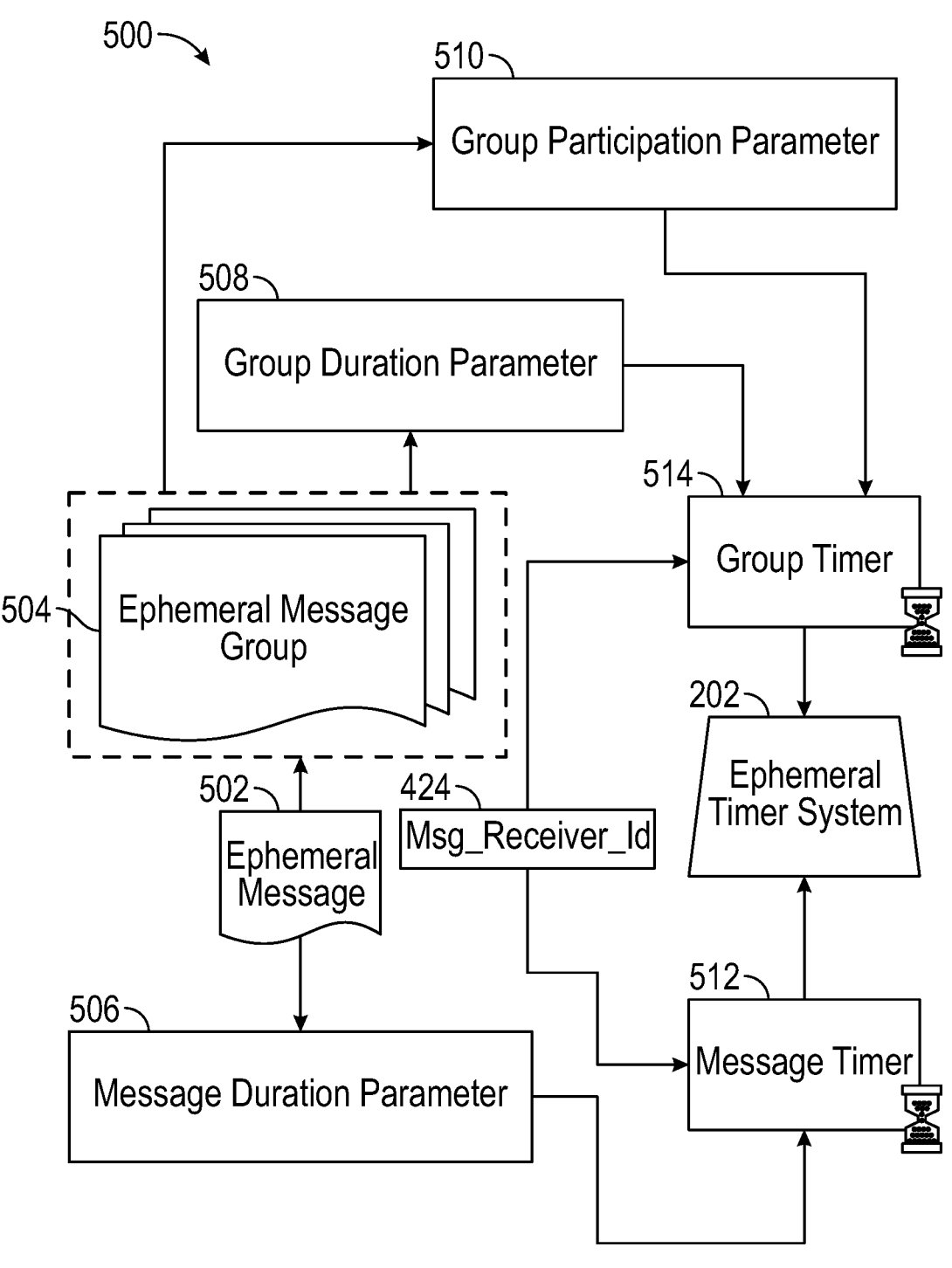
FIG. 5 is a schematic diagram illustrating an access-limiting process in terms of which access to content or a content collection may be time-limited, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Each ephemeral message 502 within the ephemeral message group 504 may have an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424. Accordingly, the group timer 514 operationally controls the overall lifespan of an associated ephemeral message group 504, as well as an individual ephemeral message 502 included in the ephemeral message group 504.

In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may further operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Machine Architecture

Figure 6:
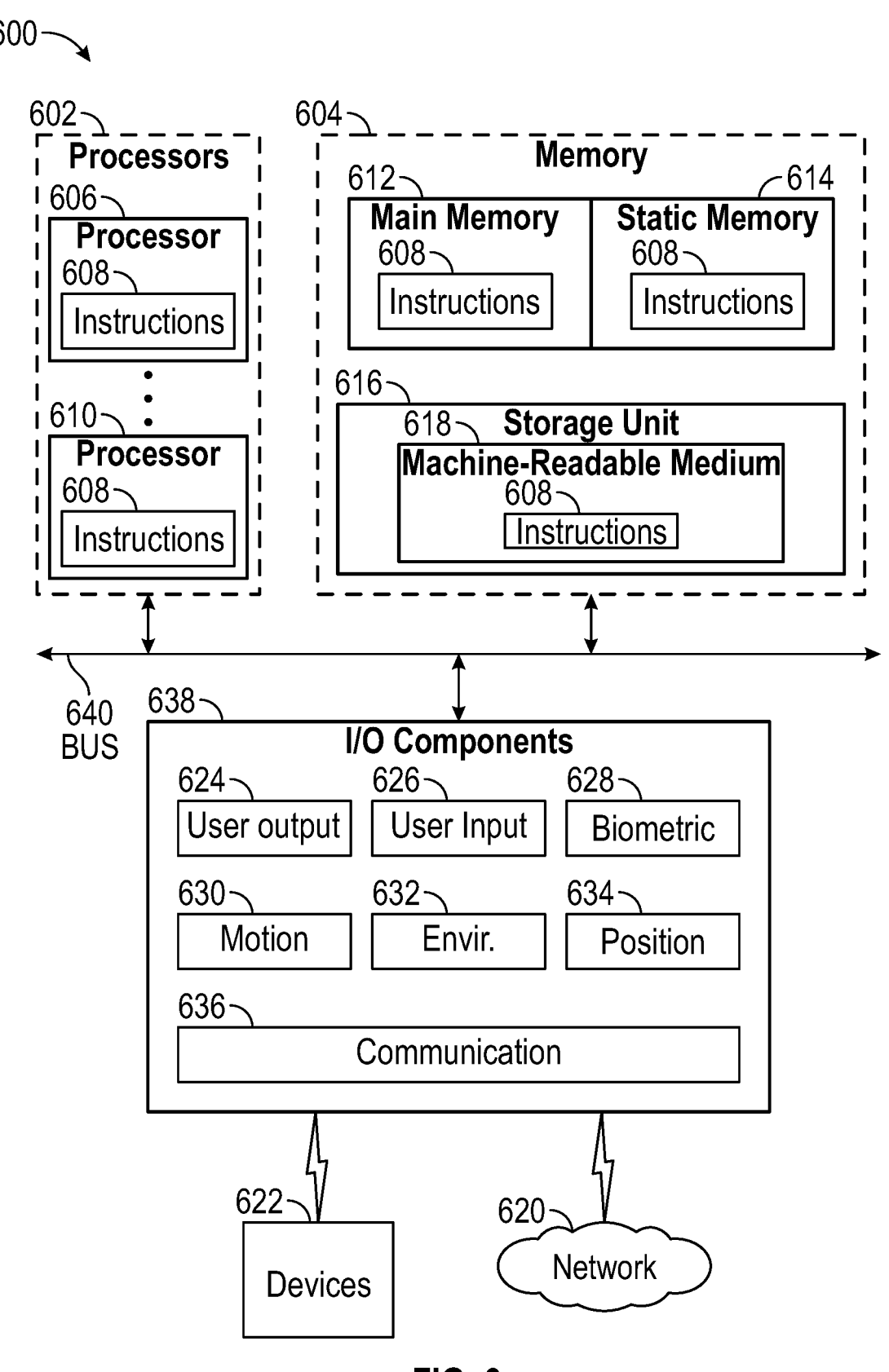
FIG. 6 is a diagrammatic representation of a computer system within which a set of instructions may be executed for causing the computer system to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, nonprogrammed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine (e.g., messaging server system 108) or a client machine (e.g., client device 102) in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output I/O components 638, which may be configured to communicate with each other via a bus 640. The processors 602 may be termed computer processors, in accordance with some embodiments. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 may include a main memory 612, a static memory 614, and a storage unit 616 accessible to the processors 602 via the bus 640. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 may include acceleration sensor components (e.g., accelerometer), gravitation sensor components, rotation sensor components (e.g., gyroscope). The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos. Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 634 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 638 may further include communication components 636 operable to couple the machine 600 to a network 620 or devices 622 via respective coupling or connections. For example, the communication components 636 may include a network interface component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), WI-FI® components, and other communication components to provide communication via other modalities. The devices 622 may be another machine or any of a wide variety of peripheral devices (e.g., a peripheral device coupled via a USB). Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via WI-FI® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples. The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Software Architecture

Figure 7:
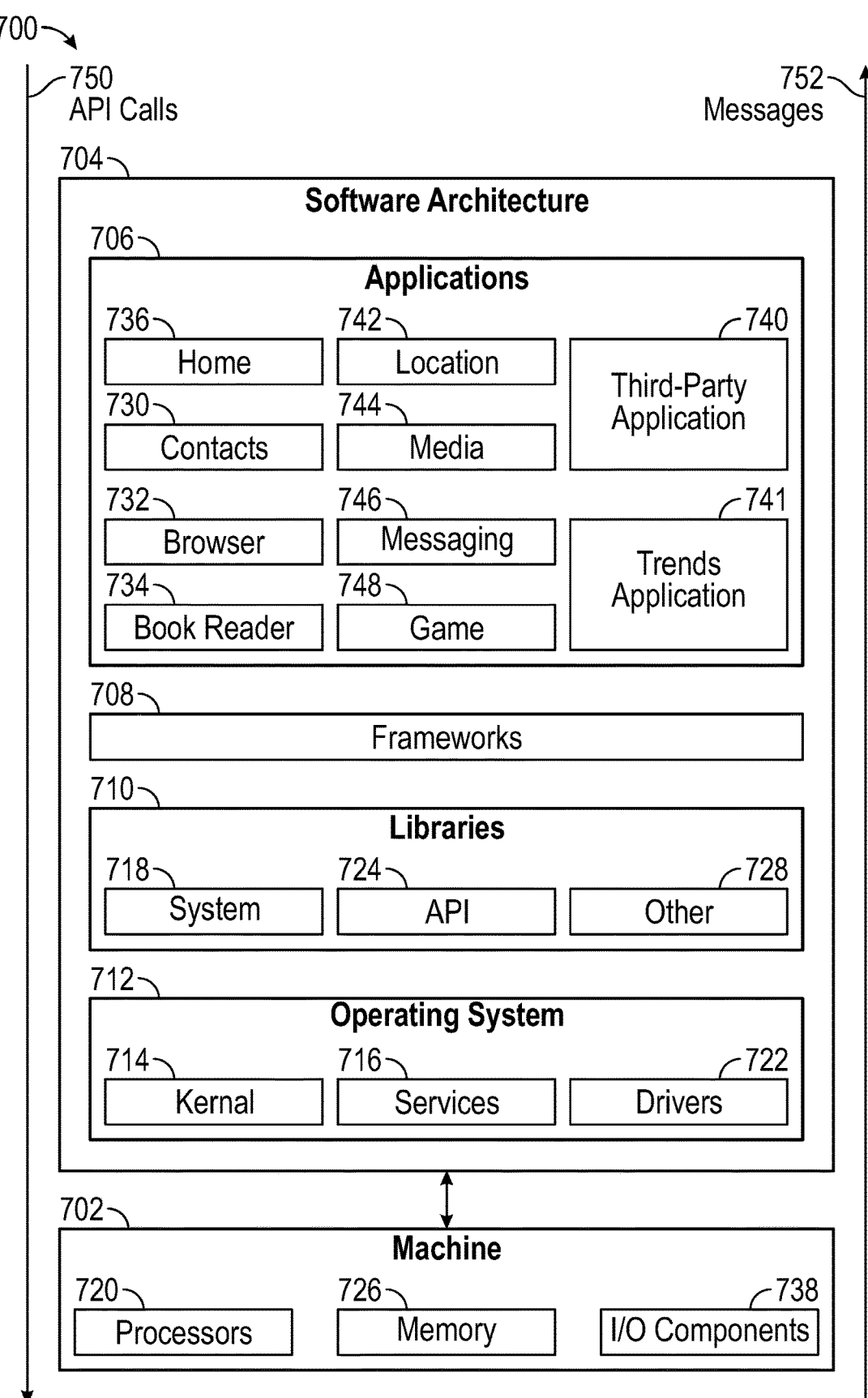
FIG. 7 is a block diagram showing a software architecture within which examples described herein may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLU- ETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706. The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a trends application 741, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Evolution of Topics

Those skilled in the art will appreciate that it is difficult to understand how topics and users' interests evolve in social media platforms including a messaging system of the type described above with respect to FIGS. 1-7. Users' interests may be volatile and time-sensitive. Topics may evolve in a few hours and then disappear (e.g., a sports event) or they may be a long-term evolving topic. Time series regression and forecasting models differ among topics since a time series encompasses different aspects in terms of seasonality, stationarity, tendency, and noise. It is difficult (or even impractical) to choose a single model that will identify all evolving topics and quantify the growth patterns of topics.

In social media platforms, users' interactions are often based on sharing textual contents (e.g., captions) with other users. This content can correlate to a wide variety of topics and users' interests evolve over time given external factors such as holidays or different moments in their lives. Thus, understanding how the interest of users of a social media messaging system evolve may enable targeting of a specific audience or sustaining daily active users using insights about future behaviors in the social media platform. To enable the privacy-preserving understanding of evolving topics, the systems and methods described herein (i) extract and clean N-grams from captions, i.e., preserving user privacy, (ii) detect anomalous behaviors in n-grams frequencies over time and select candidates (N-grams) to be evolving or fading topics, (iii) cluster candidates into groups, (iv) train time series forecasting models regarding the obtained groups in (iii) to predict N-gram frequencies in the next days/weeks/months, and (v) identify evolving and fading patterns. With these insights about evolving topics, the interests that users should keep promoting in the future or that are worthy of gaining more traction are better understood. As will be described further below with respect to FIGS. 8-15, anomaly detection, clustering, and time series forecasting techniques may be used by the trends system 212 described with respect to FIG. 2 to identify evolving/fading topics in a messaging application of the type described above with respect to FIGS. 1-7.

As described above, text and media content from multiple sources may be aggregated into collections of content called stories or galleries. In configurations of the messaging system 100, users may add captions to their stories. For example, a user may add the caption "I get my second COVID shot today" to "Keep the COVID away" to messages relating to the user's experiences while obtaining a second COVID shot. In a sample configuration, N-grams may be extracted from such captions. As noted above, the N-grams may be a contiguous sequence of N items from a given text relating to a particular topic (e.g., Lakers, bitcoin, graduation, etc.). In sample configurations of the messaging system, the N-grams are closely related to user activities. Thus, to better understand the interests of users of the messaging system, it is useful to understand how users behave in relation to topics and events and how discussion of defined topics and events increases or decreases over time.

Understanding the evolution of topics is a problem that numerous entities have tried to address in different contexts. Previous research has focused on what constitutes trending topics given a date. For example, the aforementioned related U.S. patent application Ser. No. 16/948,582, filed on Sep. 24, 2020, describes a system for identifying trending topics. However, automatic detection of evolving topics from a given point in time remains a problem. For example, time series regression models differ among topics.

Figure 8A:
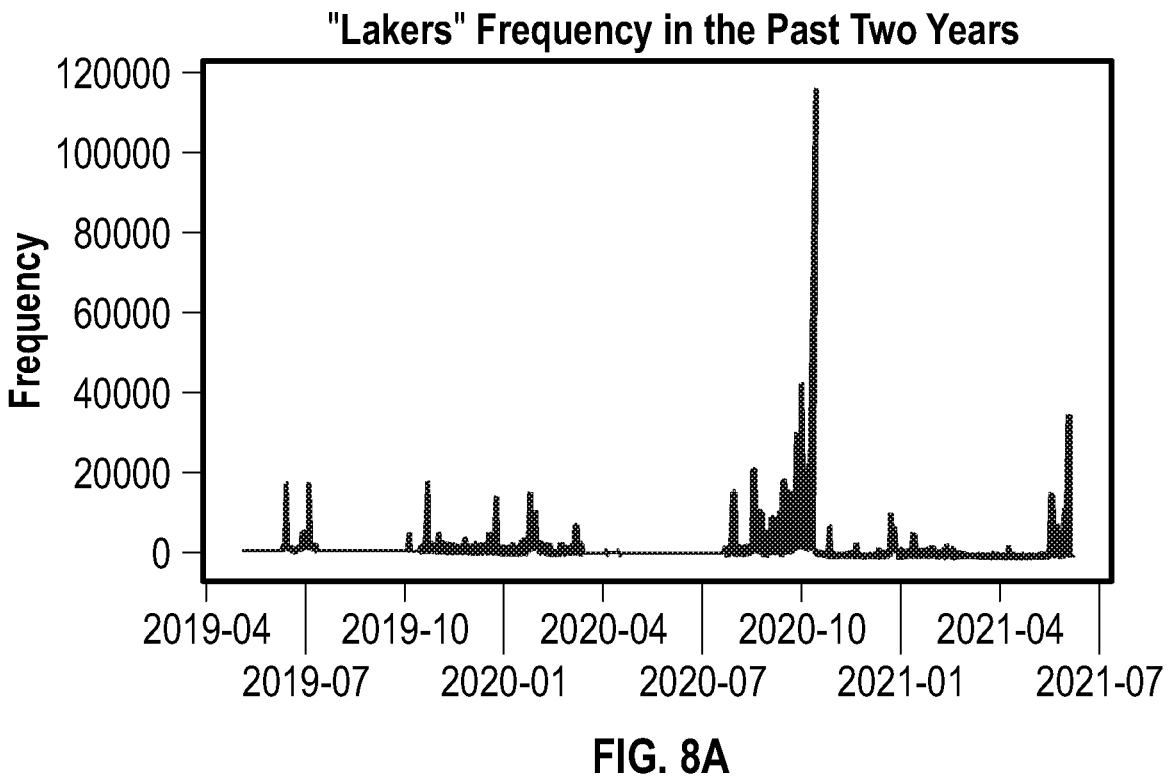
FIG. 8A is a time series of the frequency of the use of the N-gram "Lakers" in social media messaging data from April 2019 to July 2021.
Figure 8B:
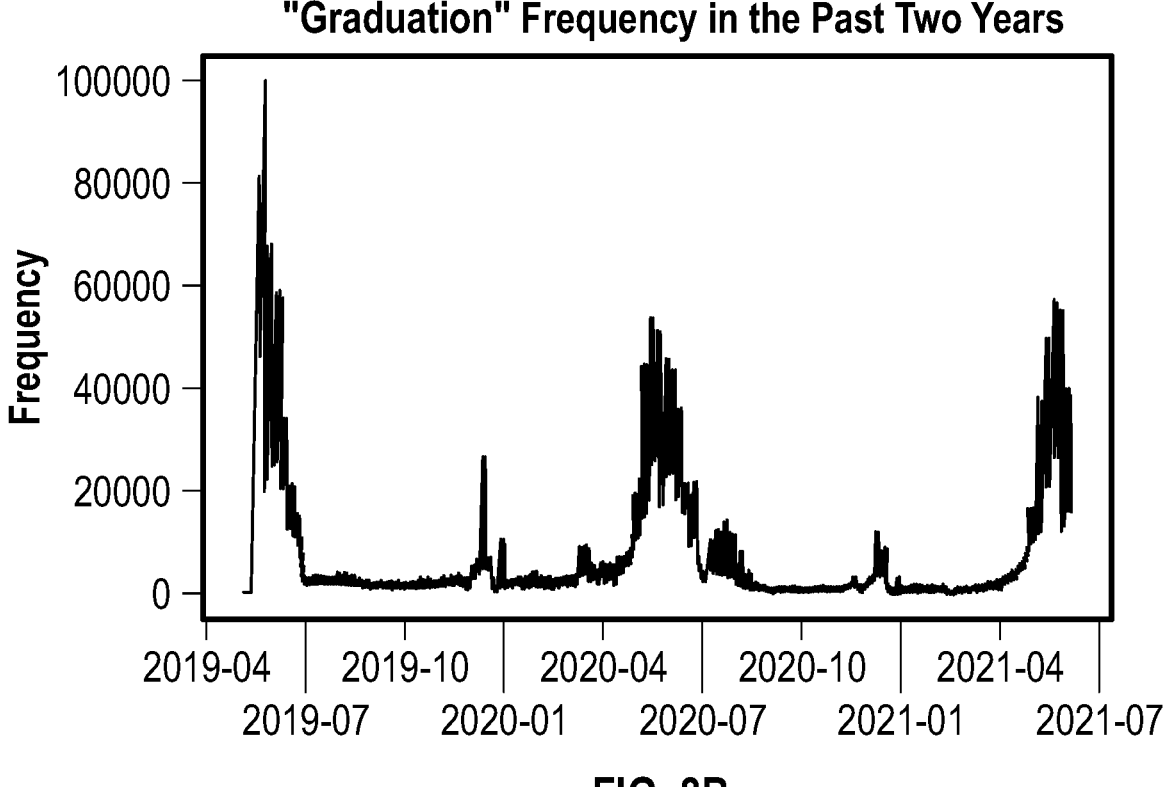
FIG. 8B is a time series of the frequency of the use of the N-gram "graduation" in social media messaging data from April 2019 to July 2021.

FIG. 8A illustrates a time series of the frequency of the use of the N-gram "Lakers" in social media messaging data from April 2019 to July 2021, while FIG. 8B illustrates a time series of the frequency of the use of the N-gram "graduation" over the same time period in the same data. As illustrated, each N-gram has its own time-dependent or event dependent pattern. Thus, different aspects such as seasonality, stationarity, and trend make establishing a time series regression model hard to find as there is no one model that addresses multiple sorts of specificities in each N-gram (or word/sentence of interest).

Existing models either do not provide any details about the future or do not fit the time series. Thus, it is desirable to try a multitude of models and to select the model for an N-gram that provides the lowest forecasting error. Accordingly, in the forecasting techniques described below, a number of different forecasting models may be applied to the time series data for respective N-grams to identify the model or models that provide the best fit to the data. Such forecasting models may include, for example, the Holt-Winters' seasonal method in which the trend equation is identical to Holt's linear method but the seasonal equation shows a weighted average between the current seasonal index and the seasonal index of the same season of a previous year.

In the example configuration described below, automatic detection of evolving (or fading) topics in the current data includes predicting the rise of new terms or their disappearance as soon as possible, as well as modeling the growth pattern of topics. The model should ideally understand and account for the impact of external events like product launches or political events in the adoption and growth of terms over short-term and long-term time frames. In the examples explained below, an evolving topic is characterized by time series models and trending metrics based on user engagement with the topics in the messaging system. Anomaly and change point detection algorithms are applied to the collected data to help identify evolving topics by identifying potential N-grams that rise or disappear in the short-term. Time series forecasting techniques are then combined with the anomaly and change point detection algorithms to predict future evolving topics based on measured trends in the underlying data.

For example, a ground truth model may be used for training a time series forecasting model for short periods of time. The time series forecasting model may then be run to predict the next period of time from the trained model. The parameters may be tweaked based on the predictive effect of the past data used in the model.

Methodology for Evolution of Topics Determination

Figure 9:
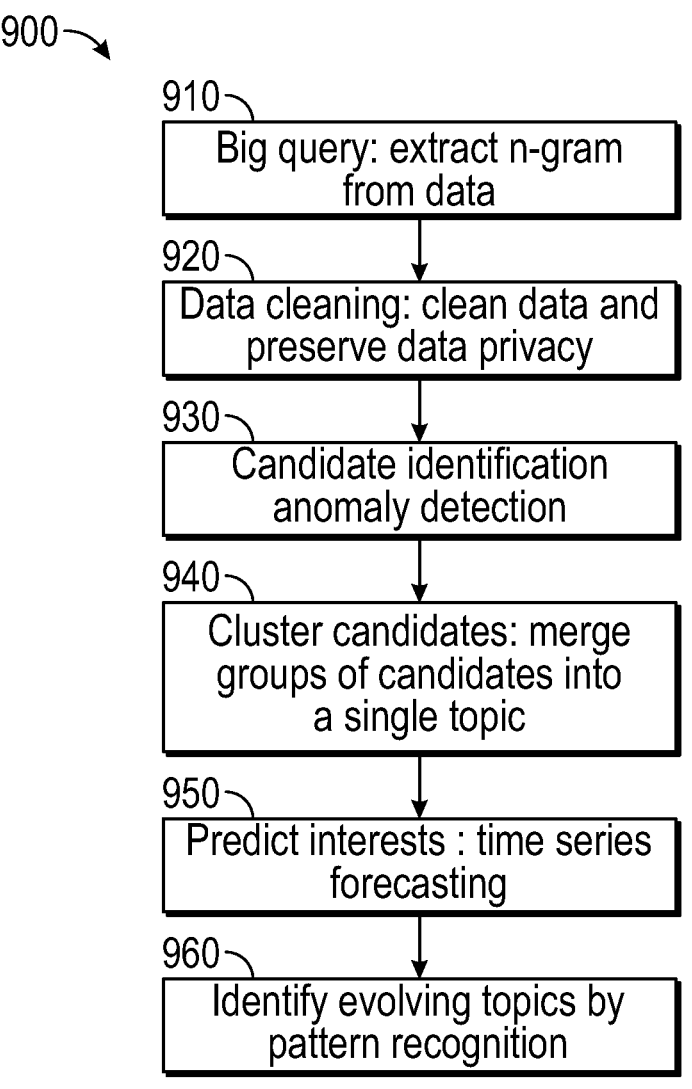
FIG. 9 is a flow chart of the method of identifying evolving topics in time series data in accordance with some examples.

In example configurations of methods for determining the evolution of topics in a messaging system 100, anomaly detection and time series forecasting techniques are used to identify evolving topics in a database with multiple time series where one time series corresponds to the frequency of a given N-gram in different timestamps for a trending topic. FIG. 9 illustrates a flow chart of the method 900 that may be implemented by a trends system 212 to identify evolving topics in time series data in a sample configuration.

As illustrated in FIG. 9, the method 900 includes extracting N-grams from content data (e.g., captions) at 910, cleaning the data to preserve data privacy at 920, identifying candidate N-grams using anomaly detection techniques at 930, clustering the candidate N-grams by merging groups of candidates into a single topic at 940, predicting interests using time series forecasting at 950, and identifying evolving topics using pattern recognition techniques at 960. Each of these steps will be described in further detail below.

The method 900 is initiated at 910 by consuming data from a database including the most significant N-grams from an input data source such as the database 120 of the messaging system described above with respect to FIGS. 1-7. In a sample configuration, words and sentences (i.e., N-grams) are extracted from captions in stories at 910 and the frequency of each extracted N-gram over time is measured using timestamps for each hour after the story was posted. In other words, the frequency of use of the monitored N-grams is monitored for each hour after the story has been posted.

The extracted data is then cleaned at 920. The data cleaning reduces the search space by focusing more on relevant words and sentences. The extracted data is also filtered to remove any personally identifiable information (PII) such as username, phone number, etc., to preserve data privacy. The data is further cleaned to remove N-grams that contain only stop words (e.g., I, you, the, etc.), only contain punctuations, do not contain at least, one noun, adjective or verb, and the like.

Candidate N-grams are identified at 930 using, for example, anomaly detection software. In an example configuration, the normal range of an N-gram frequency over time is identified. Abnormal behaviors in the N-gram frequency at the current timestamp are detected. The detected anomalies that exceed the boundaries in different moments (or timestamps) represent candidates to be evolving or fading topics. A number of different algorithms may be applied to the data to detect the anomalies.

Figure 10:
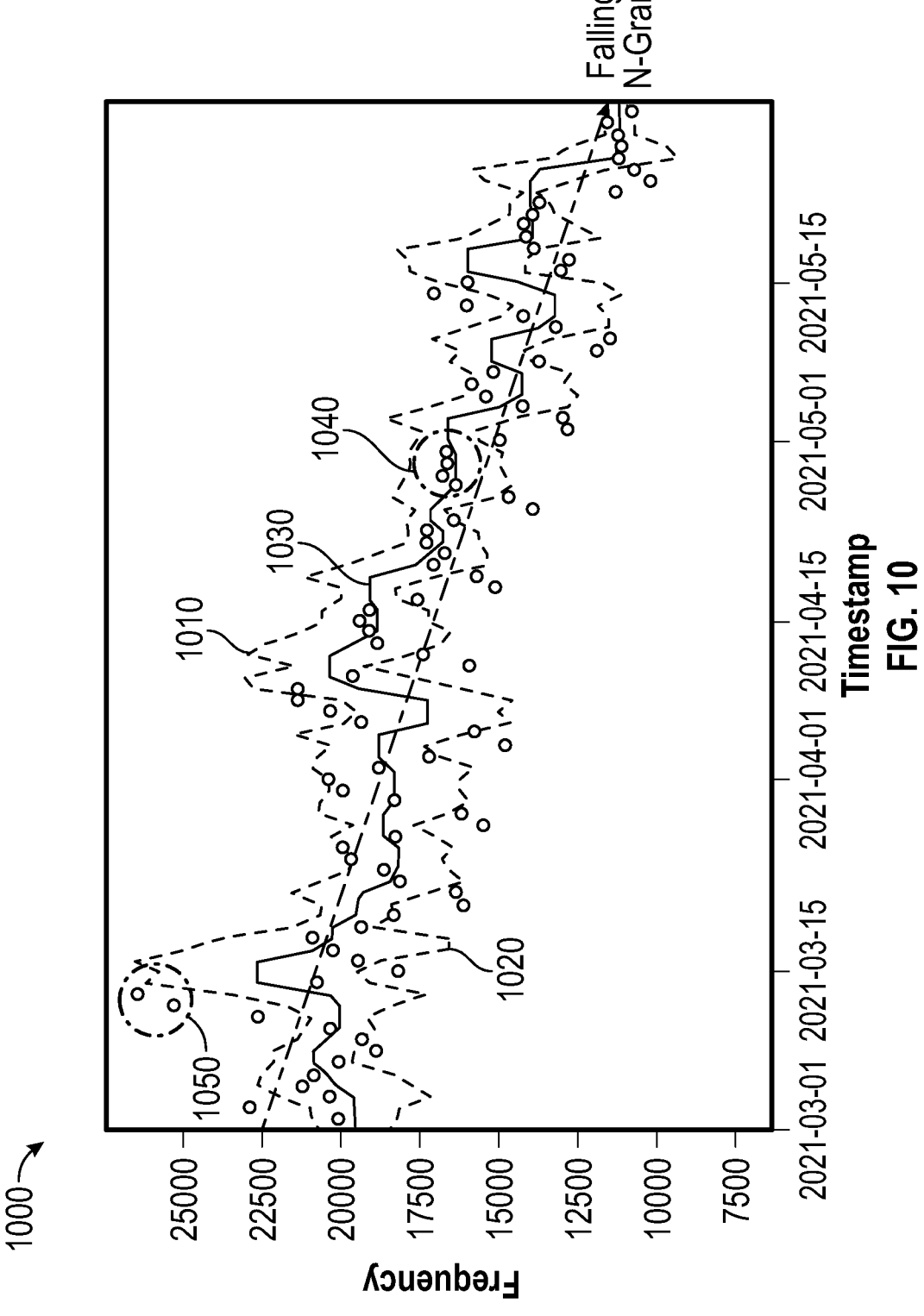
FIG. 10 illustrates the frequency of use of a selected N-gram over a time interval from Mar. 1, 2021, to Jun. 1, 2021, including the upper bound, the lower bound, and rolling median for the data points.

For example, FIG. 10 illustrates the frequency of use of a selected N-gram 1000 over a time interval from Mar. 1, 2021, to Jun. 1, 2021, including the upper bound 1010, the lower bound 1020, and rolling median 1030 for the data points 1040. The region between the upper bound 1010 and the lower bound 1020 is recognized as a prediction interval for the occurrence of the selected N-gram 1000. In this example, the prediction interval includes the region where there is a 99% confidence that the data points 1040 are within a confidence interval of moving median 1030, where the confidence interval is defined as the moving median 1030±a tolerance multiplied by the moving standard deviation and divided by the square root of the time window size. N-grams are selected based on a sum of the difference between each abnormal data point 1050 and the average rolling median 1030. In this example, the data points 1040 represent the frequency of the selected N-gram. The more outlier data points 1050 (outside the confidence interval) there are, the more likely the N-gram is growing or shrinking. In the example of FIG. 10, the N-gram is shown as shrinking over time as the frequency of the N-gram data points 1040 is shown to be shrinking over time as the slope of the N-gram frequency line is negative, thus indicating a fading number of old versus new outliers. In a sample configuration, the N-gram 1000 is used to train an anomaly detection system.

In a sample configuration, the anomaly detection system may be based on an isolation forest methodology of the type described by Liu et al., in "Method to explicitly isolate anomalies instead of profiles normal points," 2008 Eighth IEEE International Conference on Data Mining, Dec. 15-19, 2008, the contents of which are incorporated herein by reference. Such an algorithm may be used to divide the N-gram data into two groups (see FIG. 13). The anomalies are then isolated using binary trees. As explained by Liu et al., isolation forests have a linear time complexity with a low memory requirement and thus are ideally suited to separating the N-gram data.

Figure 11:
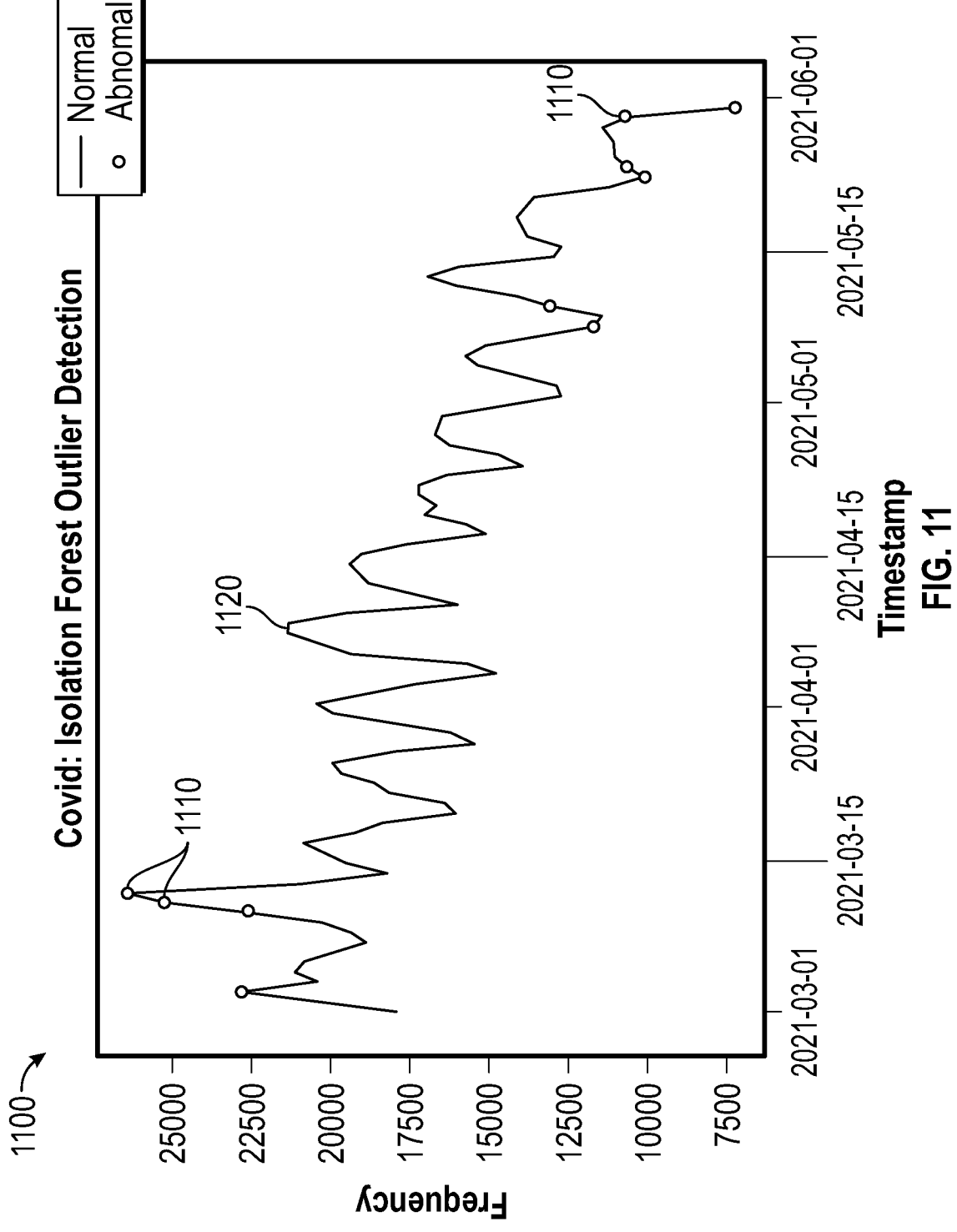
FIG. 11 is a sample N-gram of "COVID" for the time period of Mar. 1, 2021, to Jun. 1, 2021, where isolation forest outlier detection has been applied, in accordance with some examples.

FIG. 11 is a sample N-gram 1100 of "COVID" for the time period of Mar. 1, 2021, to Jun. 1, 2021, where isolation forest outlier detection has been applied. As illustrated, the abnormal points 1110 are fit to the normal curve 1120 of the collected N-gram data using the isolation forest outlier detection algorithm.

Figure 12:
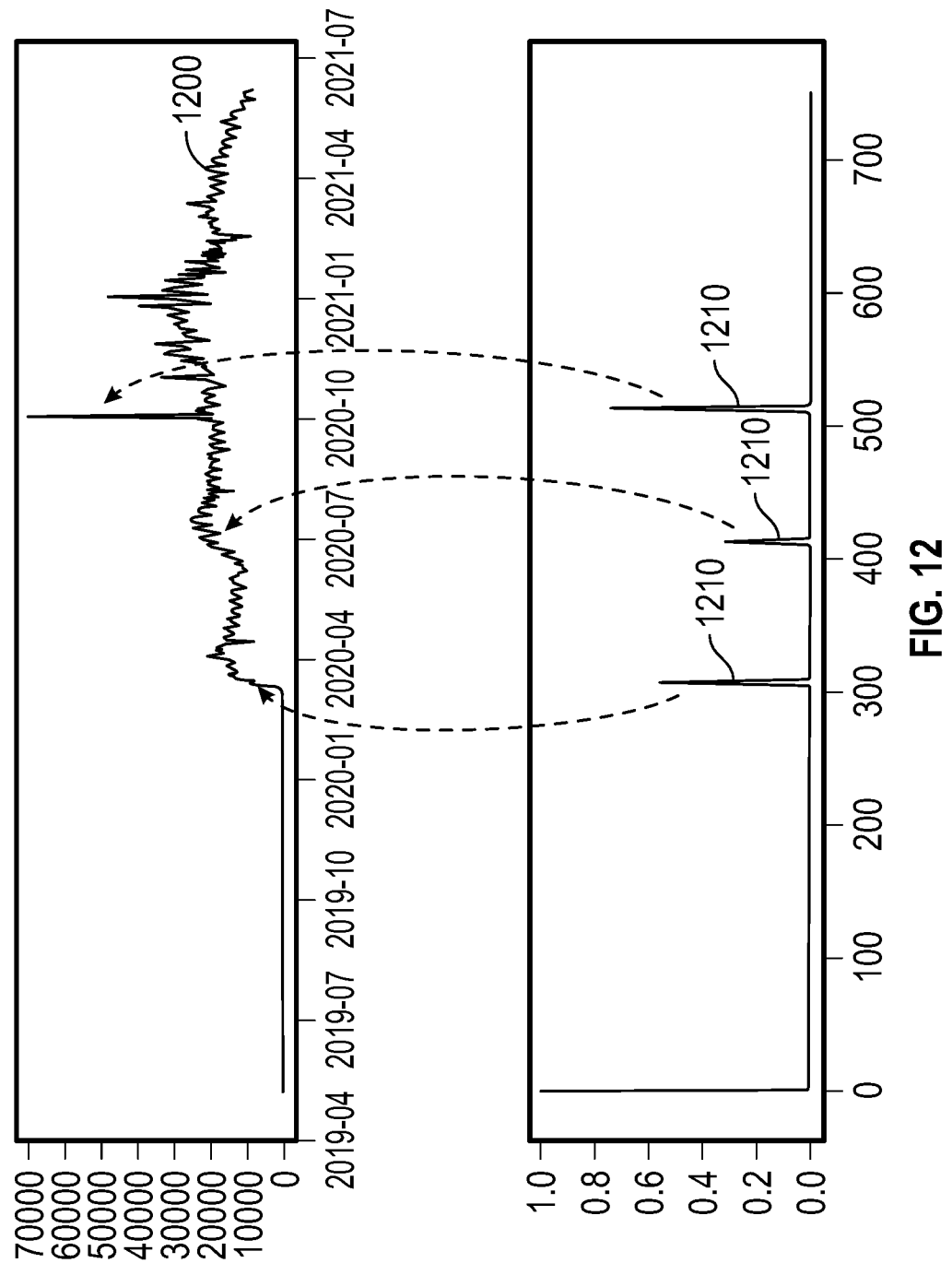
FIG. 12 illustrates the change points identified in raw data through application of changepoint detection techniques to identify anomalies, in accordance with some examples.

In sample configurations, change point detection also may be applied to the N-gram time series to detect changepoints, which are abrupt variations in the generative parameters of a data sequence. FIG. 12 illustrates the change points 1210 identified in the raw data 1200 through application of changepoint detection techniques to identify anomalies in a sample configuration. For example, Bayesian Online Changepoint Detection techniques may be applied to determine the probability of a changepoint in a time series. Such techniques compute the probability distribution over the current run or time since the last changepoint given the data so far observed. Those skilled in the art will appreciate that Bayesian Online Changepoint Detection techniques are generally good for short term analysis but are not as good for mid-to-long term analysis.

Once the outliers have been detected and the data has been partitioned, the N-gram candidates may be selected. For example, a list of abnormal data points per N-gram includes the data points 1050 above the upper bound 1010 that approach du and the data points 1050 below the lower bound 1020 that approach di. The data points 1040 are then processed as follows.

Figure 13:
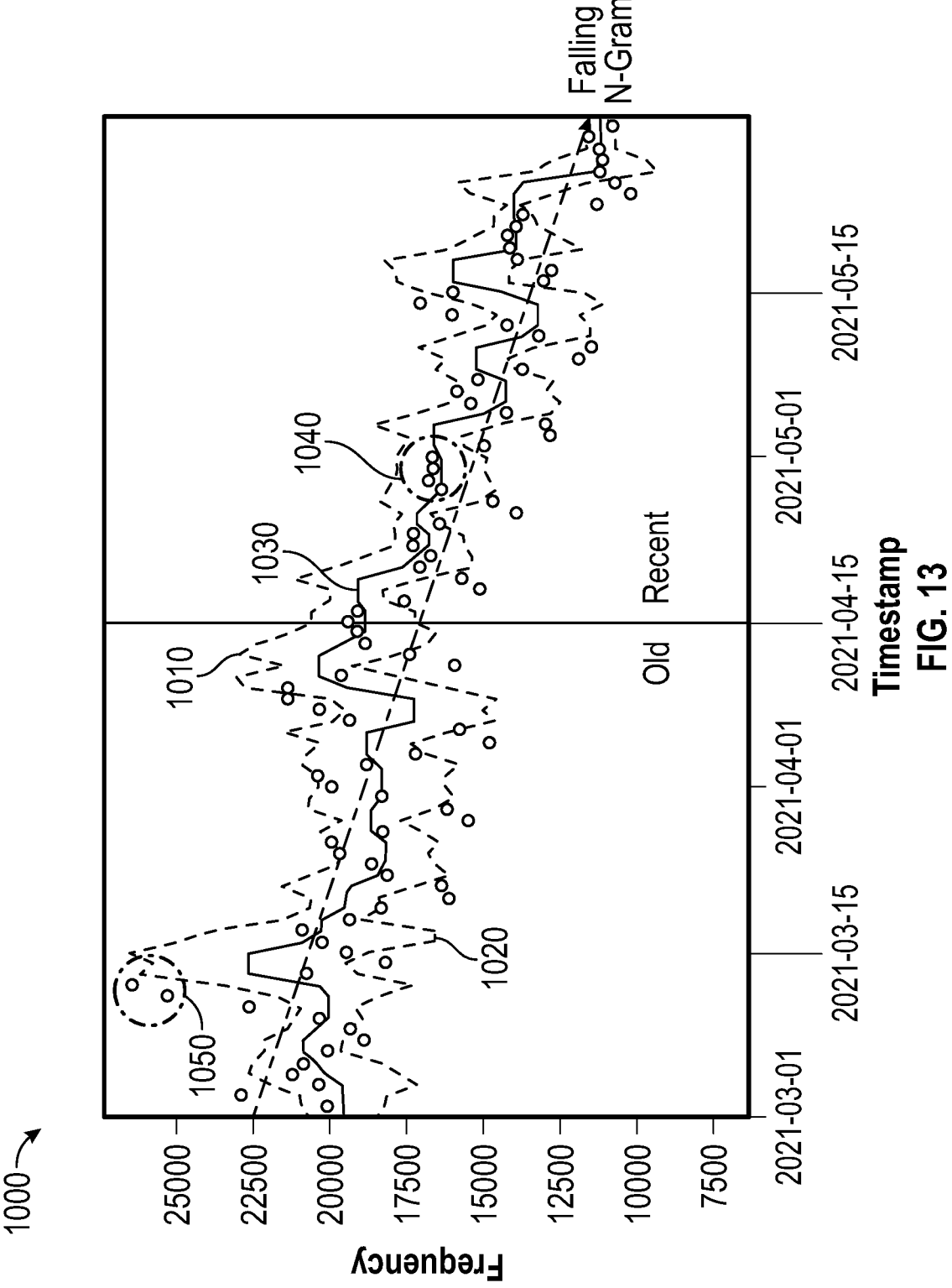
FIG. 13 illustrates the N-gram time series of FIG. 10 where, for each N-gram and bound type (upper or lower), the time series is divided into old and recent partitions (over time) to obtain the list of abnormal data points, in accordance with some examples.

For each N-gram and bound type (upper or lower), divide the time series (e.g., the time series of FIG. 10) into old and recent partitions (over time) as shown in FIG. 13 and obtain the list of abnormal data points 1050. The partitions should be selected to have the same length in time.

For each abnormal data point 1050, calculate the difference between the frequency of each abnormal data point (d) 1050 and the average rolling median (μ) 1030 for each partition (p) as follows:

$$diff(p) = \sum_{p \ in \ D_{partition}} abs(frequency(d) - \mu_{rolling \ median})$$

where $p$ is a partition $\in$ {old, recent} and $D$ is all data points in a partition

Select candidates to be evolving/fading topics as:
if diff(recent)>diff(old) then evolving/fading topic
Once the candidates to be the evolving/fading topics have been selected at 930, the candidates are clustered at 940 by merging groups of candidates into a single topic. For example, Pointwise Mutual Information (PMI) may be used to calculate the similarity of two signals (N-grams) by calculating the co-occurrence of two candidates (or N-grams) appearing together over time. The result is a matrix N×N, where N is the number of candidates (or N-grams) and its values refer to the PMI between each pair of N-grams. This PMI matrix thus establishes the distance between the N-grams and the correlation between the N-grams over time. The resulting PMI matrix may be used as input to one or more clustering algorithms (e.g., k-means, spectral clustering, agglomeration clustering, etc.) to cluster the N-grams. The output of the clustering algorithm(s) includes clusters of N-grams with similar behavior, i.e., similar frequencies over time.

A grid search on agglomerative clustering may be applied to identify the best configuration in terms of the number of clusters. In other words, the maximum silhouette score may be obtained as a measure of the consistency within the clusters of data. The silhouette technique provides a succinct graphical representation of how well each object has been classified by providing a measure of how similar an object is to its own cluster (cohesion) compared to other clusters (separation). The silhouette ranges from −1 to +1, where a high value indicates that the object is well matched to its own cluster and poorly matched to neighboring clusters. If most objects have a high value, then the clustering configuration is appropriate. If many points have a low or negative value, then the clustering configuration may have too many or too few clusters. The silhouette can be calculated with any distance metric, such as the Euclidean distance or the Manhattan distance. The silhouette score may be used to identify similar clusters to increase the similarity in each cluster and to provide more separation from one cluster to the next.

Figure 14:
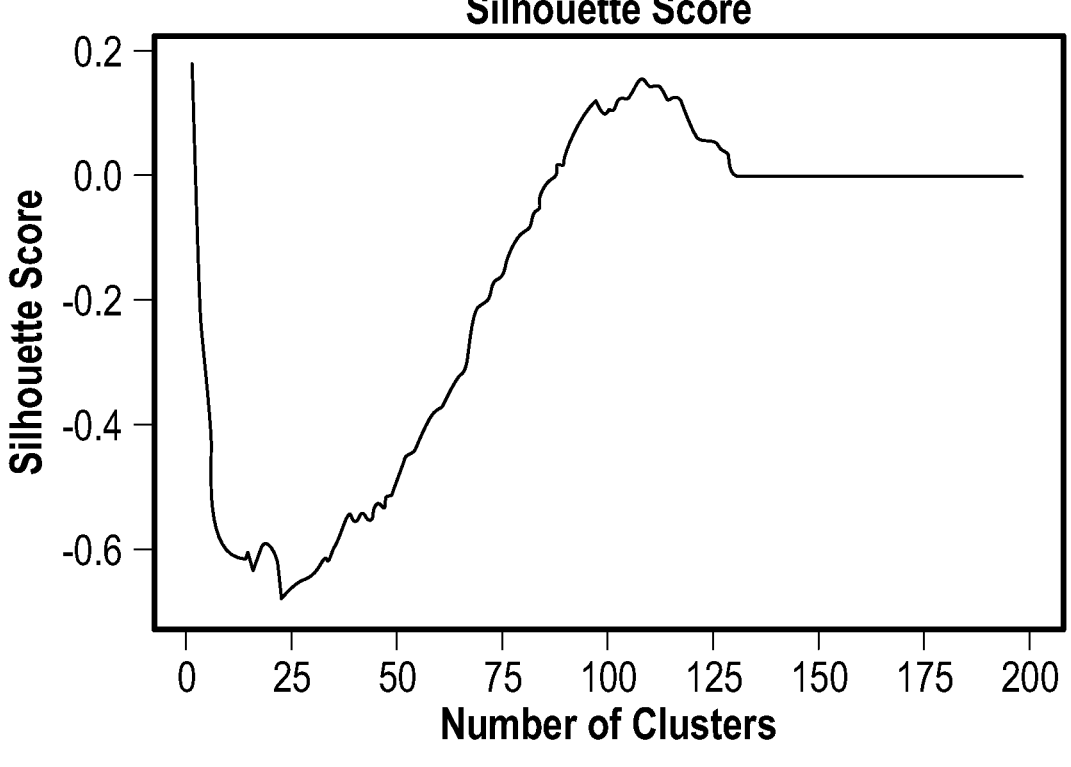
FIG. 14 illustrates a sample silhouette score for a number of clusters, in accordance with some examples.

FIG. 14 illustrates a sample silhouette score for a number of clusters. As illustrated, the silhouette score is maximized around 100 clusters at a value of about 0.15.

Once the N-gram candidates have been clustered at 940, the interests as exemplified by the messages are predicted at 950 using Time Series Forecasting (TSF). However, since training TSF for N-grams is expensive, only the N-grams with anomalous behaviors selected at 930 are named as candidates. The named candidates are grouped according to their similarity using, e.g., PMI at 940. The TSF model is then trained for each resulting cluster of N-grams. A time series with the frequency of the N-grams is used where one forecasting model is applied per cluster. In sample configurations, different TSF models may be used and the TSF model with minimal error is selected. The selected TSF model may then be used to predict N-gram frequencies in the next days/weeks/months.

Figure 15:
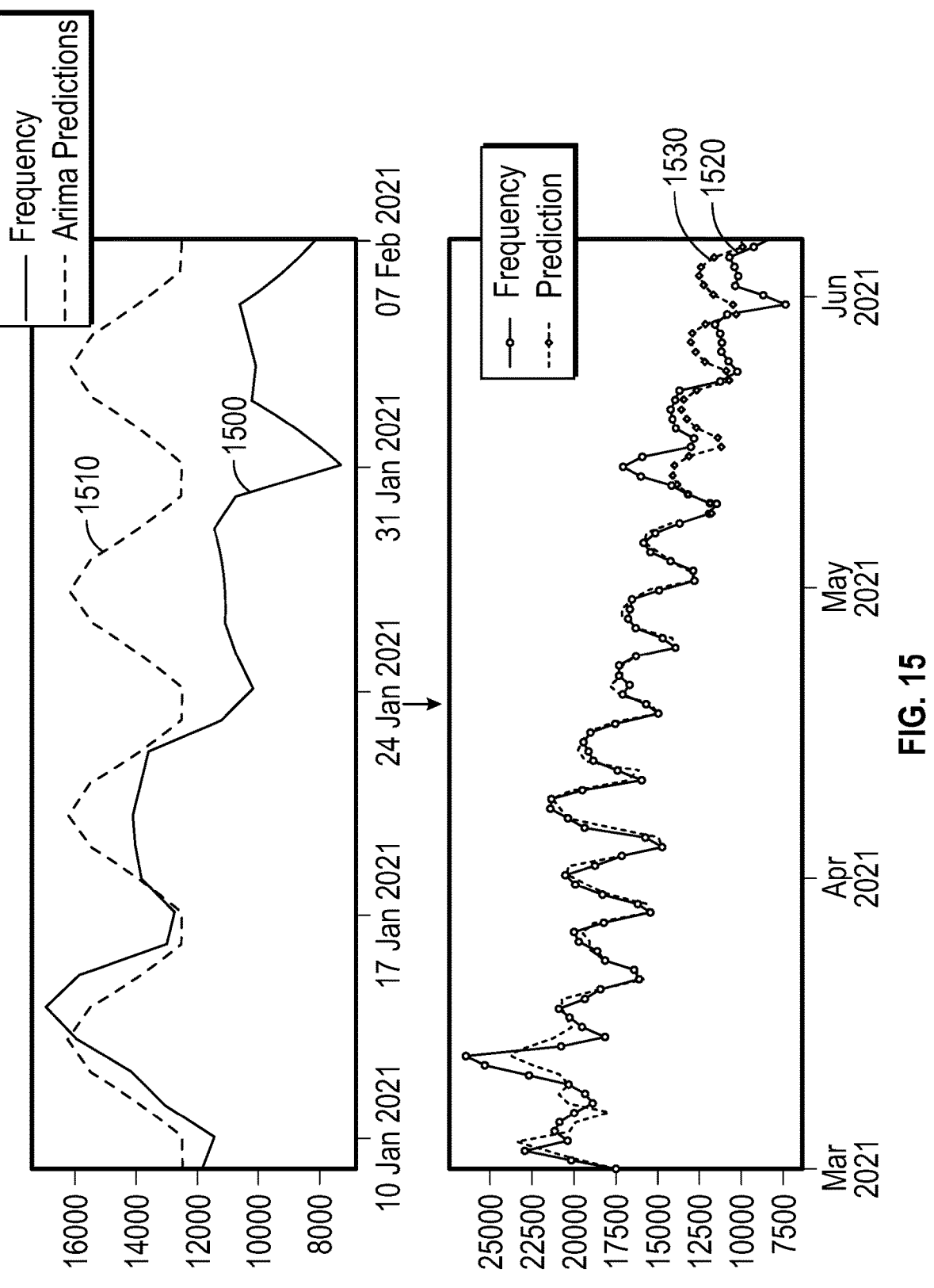
FIG. 15 illustrates a time series regression model for a measured N-gram for "COVID" for an upcoming month (June 2021) based on 3 months of training data (March to May 2021).

Those skilled in the art will appreciate that TSF is difficult due to stationarity, seasonality, data sparsity, and the like. For example, FIG. 15 illustrates a time series regression model for the measured N-gram 1500 for "COVID" for an upcoming month (June 2021) based on 3 months of training data 1520 (March to May 2021). Curve 1510 illustrates the TSF prediction determined using the well-known Auto-Regressive Integrated Moving Average (ARIMA) model that assumes the considered time series to be linear and to follow a particular known statistical distribution. On the other hand, the Holt-Winters seasonal method may provide a better fit predictive curve 1530, although it will be appreciated that other TSF methods may provide a better fit predictive curve for different cluster datasets.

A number of different TSF models may be used. Adhikari et al. provide an overview in a book entitled "An Introductory Study on Time Series Modeling and Forecasting" arXiv:1302.6613 [cs.LG](2013), Sample TSF models may include:

Forecasting at Scale as described by Taylor et al., in "Forecasting at Scale," PeerJ Preprints 5:e3190v2, 27 Sep. 2017, where Taylor frames the forecasting problem as a curve-fitting exercise. Taylor describes incorporating trend changes in a growth model by explicitly defining changepoints where the growth rate is allowed to change. The changepoints may be specified by a data analyst using known dates of product launches and other altering events or may be automatically selected given a set of candidates. Uncertainty in the forecast trend score is measured by assuming that the future will see the same average frequency and magnitude of rate changes that were seen in the historical data. The rate scale parameter may be inferred from the historical data and a generative model applied to simulate possible future trends that are used to compute uncertainty intervals. Taylor also accounts for business time series with multi-period seasonality that repeats on a weekly and seasonal basis and for holidays and other events that provide predictable, but non-periodic, disruptions to business time series.

Oreshkin et al. describe in "N-BEATS: neural basis expansion analysis for interpretable time series forecasting" (arXiv: 1905.10437 [cs.LG], Cornell University, May 24, 2019) a deep neural architecture based on backward and forward residual links and a very deep stack of fully-connected layers to solve the univariate time series point forecasting problem using deep learning.

Salinas et al. describe in "DeepAR: Probabilistic forecasting with autoregressive recurrent networks," International Journal of Forecasting, Vol. 36, Issue 3, July-September 2020, pages 1181-1191, a probabilistic forecasting (estimating a time series' future probability distribution given its past) as a key enabler for optimizing business processes. The methodology is based on training an autoregressive recurrent neural network model on a large number of related time series. Salinas et al. propose a recurrent neural network (RNN) architecture for probabilistic forecasting, which incorporates a negative binomial likelihood for count data as well as special treatment for the case where the magnitudes of the time series vary widely.

Other TSF models that may be used will be apparent to those skilled in the art.

Referring back to FIG. 9, evolving and fading topics are identified at 960 using pattern recognition. The frequencies of an N-gram in the next days/weeks/months is predicted at 950 to identify demands on the user interest for different use cases. The most recent data points and predicted data points (for the same N-gram) are used to discover the patterns for evolving or fading topics. The linear slope of the N-gram may be calculated to identify the tendency of the N-gram and to define specific behaviors. A positive slope indicates that the N-gram topic is evolving, while a negative slope indicates that the N-gram topic is fading. The magnitude of the slope represents the change in volume for N-grams related to the topic.

Thus, the systems and methods described herein may provide automatic and preemptive identification of evolving and fading topics in the form of a word or sentence in captions. In sample configurations, the techniques described herein organize and select N-grams in a messaging system that can be potential evolving/fading topics using anomaly detection and clustering techniques for segmented data. The number of N-grams is reduced to allow processing with one model for each cluster. Time series forecasting for each group of clusters is used to predict the frequency of data points and to reduce the uncertainty of the future behavior/tendency. Linear regression is also used to identify evolving and fading topics by calculating if an N-gram is evolving/fading and how fast the N-gram is growing or fading. The analysis may be easily changed by changing the time window of interest and the duration of the time windows (e.g., mid to long-term time windows). The same process would be used for time windows of different sizes.

Those skilled in the art will appreciate that the techniques described herein may be used in a number of practical applications. The systems and methods described herein may be used to retain users on a social media platform by providing content that addresses their interests. For example, content could be provided relating to topics that are predicted to increase. Also, the techniques described herein may suggest topics that need some boost so that they do not disappear in a social media platform, i.e., it is useful for advertising and marketing initiatives. For example, in such a case, advertising would target the topics that are predicted to decline. Identifying evolving topics also can benefit content creation by brands and other corporate content creation teams. The ability to predict which topics are likely to increase in popularity will enhance understanding of the effects of interventions like product launches and marketing campaigns on topic popularity and provide a better measure of the success of the associated metrics. Also, if the techniques described herein predict that a topic will be popular, the ranking algorithms may be tweaked to show more of that topic to boost engagement (and even speed up topic popularity). For example, a commercial shown during the Super Bowl may initiate talk about a product. Thus, the impact of the product on social media may be predicted and acted upon using the techniques described herein by, for example, providing content relating to topics that are identified as evolving, providing advertising relating to topics that are identified as fading, or adjusting a ranking algorithm for a topic identified as evolving or fading.

System Configurations

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed herein can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The features and flow charts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A computer-implemented method of automatically detecting evolving topics in a messaging system comprising a messaging application server and at least one messaging client and controlling presentation of content to the at least one messaging client based on the evolving topics, comprising:

extracting, by at least one computer processor of the messaging application server, N-grams from data content in the messaging system;

detecting, by the at least one computer processor, anomalous behavior in N-gram frequencies over time and using the anomalous behavior to select candidate N-grams exhibiting anomalous behavior for a determination of whether topics of candidate N-grams are evolving or fading;

clustering, by the at least one computer processor, the candidate N-grams by merging candidate N-grams into a topic;

training, by the at least one computer processor, at least one time series forecasting model using the clustered candidate N-grains to predict N-gram frequencies of the clustered candidate N-grams in a future time window;

applying, by the at least one computer processor, pattern recognition to the predicted N-gram frequencies of the clustered candidate N-grams to automatically identify an evolving or fading pattern in the topic; and at least one of providing, by the at least one computer processor, content relating to the topic to the at least one messaging client when the topic is identified as evolving, providing, by the at least one computer processor, advertising relating to the topic to the at least one messaging client when the topic is identified as fading, or adjusting, by the at least one computer processor, a ranking algorithm for the topic when the topic is identified as evolving or fading.

2. The method of claim 1, wherein the data content in the messaging system comprises captions of messages sent in the messaging system.

3. The method of claim 1, further comprising receiving, by the at least one computer processor, at least one query table including a plurality of N-grams from an input data source of the messaging system, the plurality of N-grams including the N-grams from data content in the messaging system.

4. The method of claim 1, further comprising cleaning, by the at least one computer processor, the extracted N-grams to remove any personally identifiable information (PII) and to focus on words and sentences relevant to one or more topics.

5. The method of claim 1, wherein detecting anomalous behavior in the N-gram frequencies over time and using the anomalous behavior to select candidate N-grams comprises using anomaly detection software executed by the at least one computer processor to identify a normal range within boundaries of an N-gram frequency over time, to detect abnormal behaviors in the N-gram frequency at a timestamp, and to select the candidate N-grams as anomaly N-gram data points that exceed the boundaries at different timestamps.

6. The method of claim 5, further comprising selecting, by the at least one computer processor, a candidate N-gram based on a sum of a difference between each N-gram frequency outside the boundaries of the N-gram frequency over time and an average of a rolling median of a frequency of the selected candidate N-gram over time.

7. The method of claim 6, further comprising dividing, by the at least one computer processor, N-gram data for the candidate N-grams into two groups and isolating anomalies using binary trees or by applying isolation forest methodology to the N-gram data.

8. The method of claim 5, wherein detecting anomalous behavior in the N-gram frequencies over time and using the anomalous behavior to select candidate N-grams comprises detecting, by the at least one computer processor, at least one changepoint in the N-gram frequencies over time as an anomaly.

9. The method of claim 5, wherein selecting the candidate N-grams comprises processing, by the at least one computer processor, anomaly N-gram data points by:

for each N-gram and upper or lower boundary of the N-gram frequency over time, dividing a time series of the N-gram frequency into old and recent partitions and obtaining a list of anomalies within the old and recent partitions;

for each anomaly N-gram data point, calculating a difference between a frequency of each anomaly (d) and an average rolling median (p) for each partition (p) as follows:

$$diff(p) = \sum_{p \ in \ D_{partition}} abs(frequency(d) - \mu_{rolling \ median})$$

where $p$ is a partition $\in$ {old, recent} and $D$ is all data points in a partition;

and selecting the candidate N-grams as evolving or fading topics when diff(recent partition)>diff (old partition).

10. The method of claim 1, wherein clustering the candidate N-grams comprises merging, by the at least one computer processor, groups of candidate N-grams into the topic by using a Pointwise Mutual Information (PMI) algorithm to calculate a co-occurrence of two candidate N-grams appearing together over time.

11. The method of claim 10, further comprising using, by the at least one computer processor, an N×N PMI matrix output by the PMI algorithm, where N is a number of candidate N-grams, as input to one or more clustering algorithms to cluster the candidate N-grams.

12. The method of claim 11, further comprising identifying, by the at least one computer processor, a best N-gram cluster configuration in terms of a number of clusters based on a silhouette score for each N-gram cluster configuration.

13. The method of claim 1, wherein training the at least one time series forecasting model using the clustered candidate N-grams to predict N-gram frequencies of the clustered candidate N-grams in the future time window comprises training, by the at least one computer processor, at least two time series forecasting models for different cluster groups of candidate N-grams and selecting a time series forecasting model that produces less error to predict the N-gram frequencies of the clustered candidate N-grams in the future time window.

14. The method of claim 1, wherein applying pattern recognition to the predicted N-gram frequencies of the clustered candidate N-grams to identify the evolving or fading pattern of the topic comprises using, by the at least one computer processor, recent data points and predicted data points for et a candidate N-gram to discover patterns for evolving or fading topics and calculating, by the at least one computer processor, a linear slope of the candidate N-gram to identify whether a topic of the candidate N-gram is evolving or fading, where a positive slope of the candidate N-gram indicates that the topic of the candidate N-gram is evolving and a negative slope of the candidate N-gram indicates that the topic of the candidate N-gram is fading.

15. A messaging system that determines topics to present to users, comprising:

at least one messaging client, a messaging application server one or more computer processors and one or more computer-readable media storing instructions that, when executed by the one or more computer processors, cause the messaging application server to automatically detect evolving topics and to control presentation of content to the at least one messaging client based on the evolving topics by performing operations comprising:

extracting N-grams from data content shared between the at least one messaging client and the messaging application server;

detecting anomalous behavior in N-gram frequencies over time and using the anomalous behavior to select candidate N-grams exhibiting anomalous behavior for a determination of whether topics of candidate N-grams are evolving or fading;

clustering the candidate N-grams by merging candidate N-grams into a topic;

training at least one time series forecasting model using the clustered candidate N-grams to predict N-gram frequencies of the clustered candidate N-grams in a future time window;

applying pattern recognition to the predicted N-gram frequencies of the clustered candidate N-grams to automatically identify an evolving or fading pattern in the topic; and at least one of providing content relating to the topic to the at least one messaging client when the topic is identified as evolving, providing advertising relating to the topic to the at least one messaging client when the topic is identified as fading, or adjusting a ranking algorithm for the topic when the topic is identified as evolving or fading.

16. The messaging system of claim 15, further comprising anomaly detection software executed by the one or more computer processors to identify a normal range within boundaries of an N-gram frequency over time, to detect abnormal behaviors in the N-gram frequency at a timestamp, and to select the candidate N-grams as the detected anomalies that exceed the boundaries at different timestamps, where each candidate N-gram is based on a sum of a difference between each N-gram frequency outside the boundaries of the N-gram frequency over time and an average of a rolling median of a frequency of the selected candidate N-gram over time.

17. The messaging system of claim 15, further comprising instructions that, when executed by the one or more computer processors, cause the messaging application server to detect at least one changepoint in the N-gram frequencies over time as an anomaly and to process anomaly N-gram data points by:

for each N-gram and upper or lower boundary of the N-gram frequency over time, dividing a time series of the N-gram frequency into old and recent partitions and obtaining a list of anomalies within the old and recent partitions;

for each anomaly N-gram data point, calculating a difference between a frequency of each anomaly (d) and an average rolling median (p) for each partition (p) as follows:

$$diff(p) = \sum_{p \ in \ D_{partition}} abs(frequency(d) - \mu_{rolling \ median})$$

where $p$ is a partition $\in$ {old, recent} and $D$ is all data points in a partition;

and selecting the candidate N-grams as evolving or fading topics when diff(recent partition)>diff (old partition).

18. The messaging system of claim 15, further comprising instructions that, when executed by the one or more computer processors, cause the messaging application server to:

merge groups of candidate N-grams into the topic by using a Pointwise Mutual Information (PMI) algorithm to calculate a co-occurrence of two candidate N-grams appearing together over time;

use an N×N PMI matrix output by the PMI algorithm, where N is a number of candidate N-grams, as input to one or more clustering algorithms to cluster the N-grams;

identify a best N-gram cluster configuration in terms of a number of clusters based on a silhouette score for the N-gram cluster configuration;

train at least two time series forecasting models for different cluster groups of N-grams and selecting a time series forecasting model that produces less error to predict the N-gram frequencies of the clustered candidate N-grams in the future time window; and use recent data points and predicted data points for a candidate N-gram to discover patterns for evolving or fading topics and calculate a linear slope of the candidate N-gram to identify whether a topic of the candidate N-gram is evolving or fading, where a positive slope of the candidate N-gram indicates that the topic of the candidate N-gram is evolving and a negative slope of the candidate N-gram indicates that the topic of the candidate N-gram is fading.

19. A non-transitory computer-readable storage medium including instructions that, when processed by one or more computer processors, cause the one or more computer processors to implement a method of automatically detecting evolving topics in a messaging system and controlling presentation of content to users of the messaging system based on the evolving topics by performing operations comprising:

extracting N-grams from data content in a messaging system;

detecting anomalous behavior in N-gram frequencies over time and using the anomalous behavior to select candidate N-grams exhibiting anomalous behavior for a determination of whether topics of candidate N-grams are evolving or fading;

clustering the candidate N-grams by merging candidate N-grams into a topic;

training at least one time series forecasting model using the clustered candidate N-grams to predict N-gram frequencies of the clustered candidate N-grams in a future time window;

applying pattern recognition to the predicted N-gram frequencies of the clustered candidate N-grams to automatically identify an evolving or fading pattern in the topic; and at least one of providing content relating to the topic to the users of the messaging system when the topic is identified as evolving, providing advertising relating to the topic to the users of the messaging system when the topic is identified as fading, or adjusting a ranking algorithm for the topic when the topic is identified as evolving or fading pattern in the topic.

\* \* \* \* \*